United States Patent [19]

Masuda

[11] Patent Number: 5,291,288
[45] Date of Patent: Mar. 1, 1994

[54] APERTURE CORRECTING CIRCUIT

[75] Inventor: Yukihiro Masuda, Kanagawa, Japan

[73] Assignee: Sony Corporation, Tokyo, Japan

[21] Appl. No.: 910,401

[22] Filed: Jul. 8, 1992

[30] Foreign Application Priority Data

Jul. 10, 1991 [JP] Japan .................. 3-170093

[51] Int. Cl.$^5$ ............................. H04N 5/208
[52] U.S. Cl. ..................... 348/252; 348/690; 348/625
[58] Field of Search ............ 358/162, 37, 164, 170, 358/166; H04N 5/208

[56] References Cited

U.S. PATENT DOCUMENTS

| | | | |
|---|---|---|---|
| 3,919,470 | 11/1975 | Blom et al. ............... | 358/162 |
| 4,680,624 | 7/1987 | Murakami ................. | 358/44 |
| 4,686,562 | 8/1987 | Yamanaka ................ | 358/32 |
| 4,855,829 | 8/1989 | Kihara ..................... | 358/162 |

OTHER PUBLICATIONS

Applicant's Submitted Prior Art (FIGS. 1-5).

*Primary Examiner*—Michael T. Razavi
*Assistant Examiner*—Joseph Colaianni
*Attorney, Agent, or Firm*—William S. Frommer; Alvin Sinderbrand

[57] ABSTRACT

A video camera is comprised of an aperture correcting signal generating circuit for generating an aperture correcting signal from a video signal of a picked-up image, and a nonlinear processing circuit for comparing the video signal with a reference voltage modulated by the aperture correcting signal and compressing the video signal at its high brightness portion higher than the reference voltage when the video signal is higher than the reference voltage.

2 Claims, 7 Drawing Sheets

Input Video Signal

Slicing Signal

Aperture Correction Signal for Slicing Signal

Compressed Signal

Compressed (Signal Mixed with Aperture Correction Signal)

Input Video Signal
FIG. 8B Aperture Correction Signal 

Reference Voltage $V_o$
0V $V_o$
Compressed Signal

Compressed Signal (Mixed with Aperture Correction Signal)

Input Video Signal

Aperture Correction Signal

Mixed Signal

Compressed Signal

APERTURE CORRECTING CIRCUIT

BACKGROUND OF THE INVENTION

1. Field of the Invention

The present invention generally relates to video cameras and, more particularly, is directed to a video camera in which an aperture of a high brightness portion can be emphasized.

2. Description of the Prior Art

In conventional video cameras, a white portion (high brightness portion) is compressed in order to extend a dynamic range of an imager signal.

FIG. 1 of the accompanying drawings shows a diagram of a conventional white compressing circuit.

Referring to FIG. 1, a video signal of a picked-up image is supplied to a video signal input terminal 1, and the video signal applied to the input terminal 1 is supplied through a resistor R1 to an output terminal 2. A junction 10 between the resistor R1 and the output terminal 2 is coupled to the anode of a diode 4, and an output of a reference voltage source 4 is supplied through a variable resistor R2 to the cathode of a diode 3.

Thus, when the video signal applied to the input terminal 1 becomes higher in level than the output level of the reference voltage source 4, the diode 3 is turned on and a gain G of the video signal developed at the output terminal 2 is expressed by the following equation (1):

$$G = R2/(R1+R2) \qquad (1)$$

If the gain G is lowered as shown by the above equation (1), then the high brightness portion is compressed. FIGS. 2A and 2B are respectively diagrams showing the state such that the white portion is compressed. When a video signal whose brightness is progressively increased as shown in FIG. 2A is supplied to the input terminal 1 of the white compression circuit shown in FIG. 1, if the level of the input video signal exceeds a constant level x determined by the output potential of the reference voltage source 4 as shown in FIG. 2B, then the gain is lowered and the high brightness portion is compressed. Incidentally, the point x in FIG. 2B is what might be called a "knee point".

In the ordinary video cameras, an aperture of the video signal of the picked-up image is frequently emphasized. In this case, the above compression of the high brightness portion is effected after the aperture is emphasized so that, when the high brightness portion is compressed as described above, an aperture correcting signal (aperture emphasizing signal) added to the video signal also is compressed. There is then the disadvantage such that the aperture of the high brightness portion becomes obscure.

More specifically, if an input video signal shown in FIG. 3A is obtained, then an aperture correction signal (see FIG. 3B) which rises at timing point in which the brightness level of this video signal is changed is generated, and this aperture correcting signal is mixed into the video signal shown in FIG. 3A, thereby obtaining a mixed signal whose aperture is emphasized as shown in FIG. 3C is obtained. If this mixed signal is supplied to the white compression circuit, then a compressed signal shown in FIG. 3D is obtained. While the aperture correcting signal is not changed in the low brightness portion where the compressed signal is not compressed, the length of the leading edge of the aperture correcting signal also is compressed in the compressed high brightness portion so that the aperture emphasizing effect can be made useless substantially. To solve this problem, such a processing is proposed that the aperture correcting signal is added to the high brightness portion of the video signal output from the white compressing circuit one more time.

FIG. 4 of the accompanying drawings shows an arrangement of a white compressing circuit and other relating elements which are used to add the aperture correcting signal to the high brightness portion one more time.

As shown in FIG. 4, a video signal (imager signal) into which the aperture correcting signal is already mixed is supplied to an input terminal 11. Then, the video signal applied to the input terminal 11 is supplied to a white compression circuit 12, in which the high brightness portion of the video signal supplied thereto is compressed. The video signal thus processed is supplied to a mixer 13. In this case, a reference voltage signal is supplied to the white compression circuit 12 from a reference voltage generator circuit 14 and thereby the high brightness portion higher than the level of this reference voltage is compressed. Further, the video signal applied to the input terminal 11 is supplied to a slicing circuit 15 and only the video signal of the brightness portion to be compressed is extracted by this slicing circuit 15. Also in this case, the reference voltage signal is supplied to the slicing circuit 15 from the reference voltage generator circuit 14, and thereby only the brightness portion higher than the level of the reference voltage is extracted. The video signal of the high brightness portion extracted by the slicing circuit 15 is supplied to an aperture correcting signal generator circuit 16 which derives an aperture correcting signal of high brightness portion. Then, the aperture correcting signal of the high brightness portion is supplied to the mixer 13, in which the aperture correcting signal of the high brightness portion is mixed with the video signal having the compressed high brightness portion supplied to the mixer 13 from the white compression circuit 12, and a mixed signal is supplied to an output terminal 17.

Thus, when a signal shown in FIG. 5A is supplied to the input terminal 11 as the video signal of the image, for example, the slicing circuit 15 extracts its high brightness portion shown in FIG. 5B and the aperture correcting signal generator circuit 16 generates an aperture correcting signal (see FIG. 5C) of only the brightness portion. Then, the aperture correcting signal of only the high brightness portion is mixed into a video signal (FIG. 5D) whose high brightness portion is compressed by the white compression circuit 12 in the mixer 13 to obtain a mixed signal shown in FIG. 5E, whereby an aperture information of the high brightness portion is restored.

Since the aperture information of the high brightness portion is restored as described above, at least the aperture of even the high brightness portion is added and hence the image information of the high brightness portion is maintained at minimum. However, the circuit configuration shown in FIG. 4 is complicated and hence the development of a circuit which can emphasize the aperture of the high brightness portion with ease has been requested so far.

OBJECTS AND SUMMARY OF THE INVENTION

Therefore, it is an object of the present invention to provide an improved video camera in which the aforesaid shortcomings and disadvantages encountered with the prior art can be eliminated.

More specifically, it is an object of the present invention to provide a video camera whose circuit configuration can be simplified.

Another object of the present invention is to provide a video camera in which an aperture of a compressed high brightness portion can be emphasized satisfactorily.

As a first aspect of the present invention, there is provided a video camera which is comprised of an aperture correcting signal generating circuit for generating an aperture correcting signal from a video signal of a picked-up image, and a nonlinear processing circuit for comparing the video signal with a reference voltage modulated by the aperture correcting signal and compressing the video signal at its high brightness portion higher than the reference voltage when the video signal is higher than the reference voltage.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 8A through 8E are respectively waveform diagrams used to explain the embodiment of the present invention.

DETAILED DESCRIPTION OF THE PREFERRED EMBODIMENT

A video camera according to an embodiment of the present invention will now be described with reference to FIGS. 6 to 8.

Figure 6:
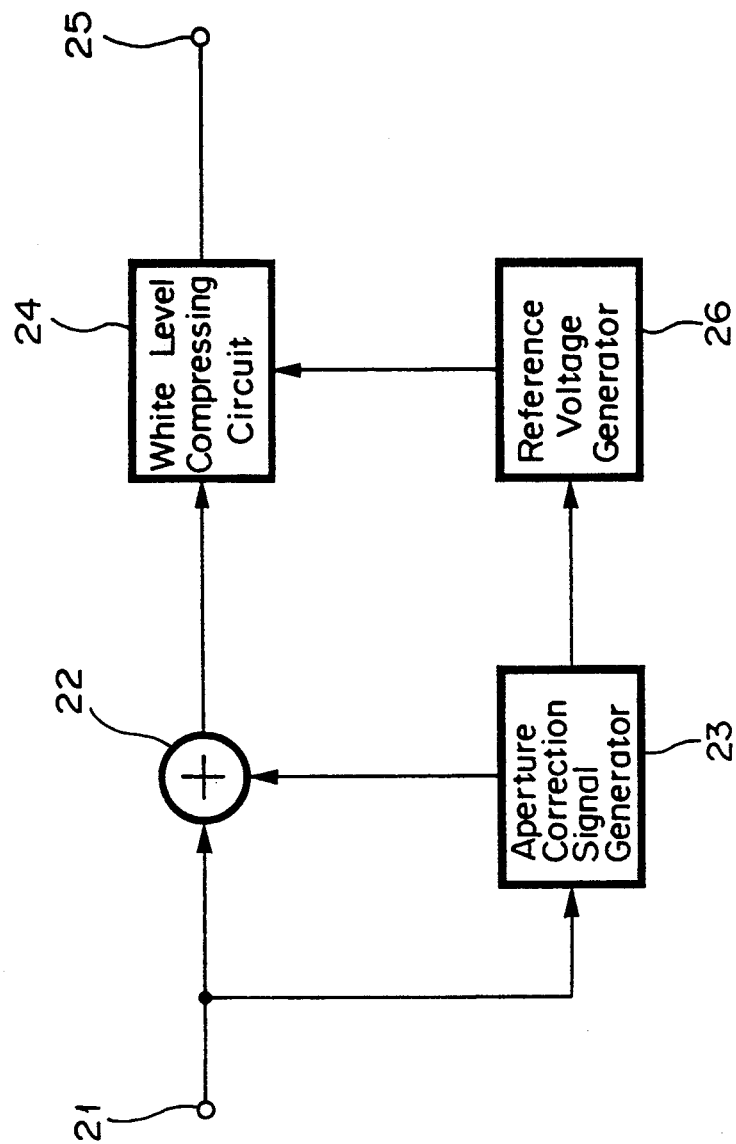
FIGS. 6 is a block diagram showing an arrangement of an embodiment of an aperture correcting circuit according to the present invention.

FIG. 6 of the accompanying drawings shows an arrangement of a white compression circuit used in the video camera according to the present invention.

Referring to FIG. 6, a video signal of a picked-up image is supplied to an input terminal 21, and the video signal applied to this input terminal 21 is not yet added with an aperture correcting signal. The video signal applied to the input terminal 21 is supplied to a mixer 22 and an aperture correction signal generator circuit 23, from which there is derived an aperture correcting signal of whole band (whole luminance level). The thus generated aperture correction signal is supplied to the mixer 22 and the aperture correcting signal is mixed to the video signal by the mixer 22, thereby obtaining a video signal (mixed signal) whose aperture is emphasized. This mixed signal is supplied to a white compression circuit 24. The white compression circuit 24 is a circuit in which a nonlinear processing is carried out in order to compress a luminance component higher than a predetermined level. The video signal whose high brightness portion is compressed is supplied through an output terminal 25 to a video signal processor circuit (not shown) of the succeeding stage. In this case, a reference voltage is supplied to the white compression circuit 24 from a reference voltage generator circuit 26 so that the compression level is determined on the basis of this reference voltage.

According to this embodiment, the aperture correcting signal generated from the aperture correcting signal generator circuit 23 is supplied to the reference voltage generator circuit 26, whereby the reference voltage output from the reference voltage generator circuit 26 is modulated by the aperture correcting signal. Accordingly, the aperture correcting signal is superimposed upon the reference voltage supplied to the white compression circuit 24 from the reference voltage generator circuit 26.

Figure 7:
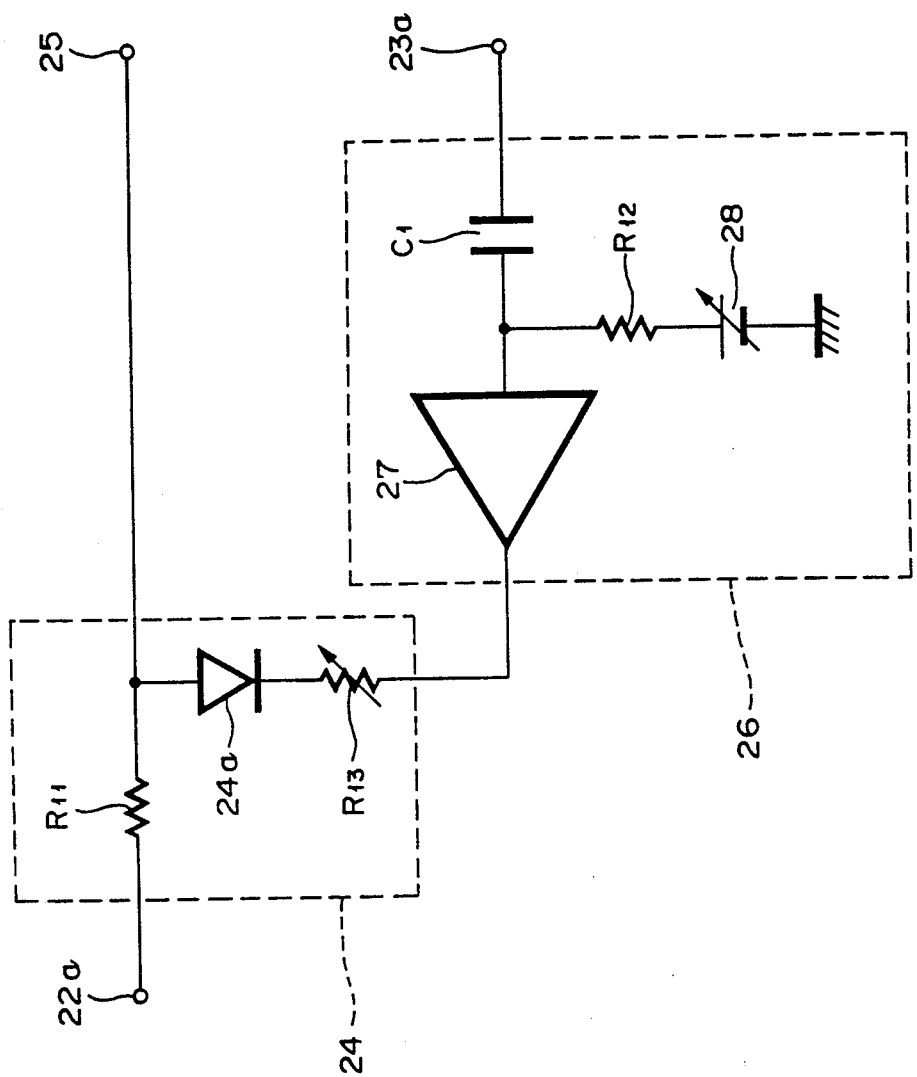
FIG. 7 is a diagram showing a main portion of the embodiment shown in FIG. 6.

FIG. 7 of the accompanying drawings shows the white compression circuit 24 and other related circuit elements thereof more in detail.

Referring to FIG. 7, the video signal from the mixer 22 (see FIG. 6) is developed at its video output terminal 22a, and the video signal applied the video output terminal 22a of the mixer 22 is supplied through a resistor R11 to the output terminal 25. A junction 100 between the resistor R11 and the output terminal 25 is connected to the anode of a diode 24a. Then, a reference voltage output from a reference voltage source 28 is supplied through a resistor R12 to a buffer 27. Also, the aperture correcting signal applied to an output terminal 23a of the aperture correcting signal generator circuit 23 is supplied through a capacitor C1 to the buffer 27. An output of the buffer 27 is supplied through a variable resistor R13 to the cathode of the diode 24a. An inclination (slope) of the compression can be adjusted by varying a resistance value of the variable resistor R13.

Operation of this circuit according to the embodiment of the present invention will be described with reference to FIGS. 8A through 8E.

Figure 8A:
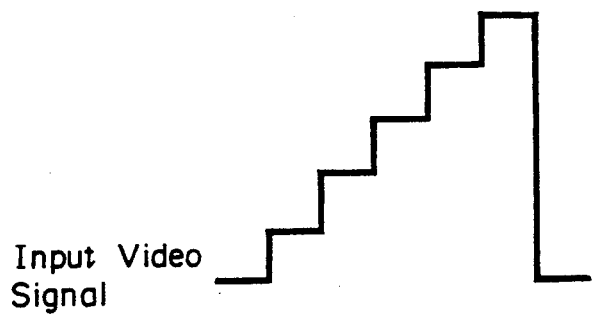

Let us first assume that a video signal shown in FIG. 8A is supplied to the mixer 22 through the terminal 21 from the circuit of the preceding stage. Then, the aperture correcting signal generator circuit 23 generates an aperture correcting signal which temporarily rises at the aperture portion of this video signal as shown in FIG. 8B. A DC component is not superimposed upon the aperture correcting signal.

Figure 8C:
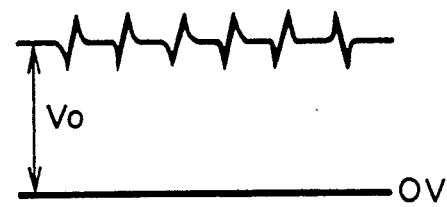

In accordance with this embodiment, this aperture correcting signal is supplied to the buffer 27, whereby the aperture correcting signal is superimposed upon the reference voltage output from the reference voltage source 28. That is, a signal in which a DC component of a reference voltage Vo is superimposed upon the aperture correcting signal as shown in FIG. 8C is obtained as the output of the buffer 27. Then, the reference voltage having this aperture correcting signal superimposed thereon is supplied to the cathode of the diode 24a so that, when the luminance level of the video signal developed at the terminal 22a exceeds this reference voltage Vo, the diode 24a is turned on, thereby effecting the compression based on the resistance values of the resistor R11 and the variable resistor R13. The reference voltage Vo from the reference voltage source 28 can be varied.

Figure 8D:
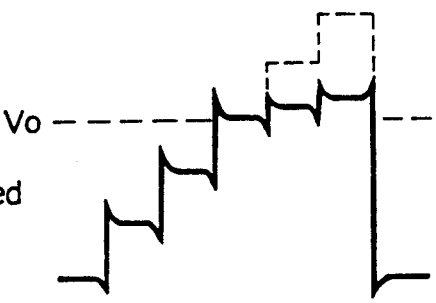
Figure 8E:
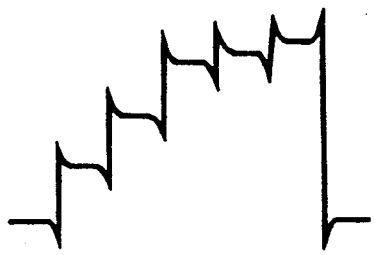
Figure 3A:
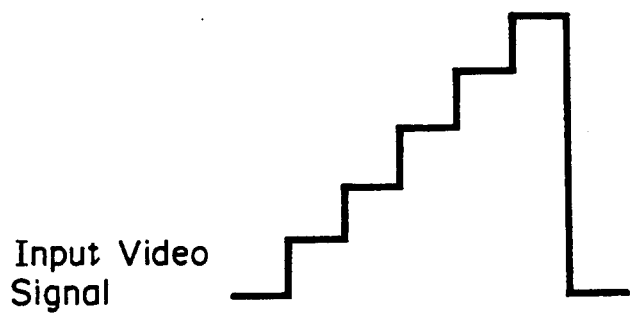
FIGS. 3A through 3D are respectively waveform diagrams used to explain the conventional white compression circuit.
Figure 3B:
Figure 3C:
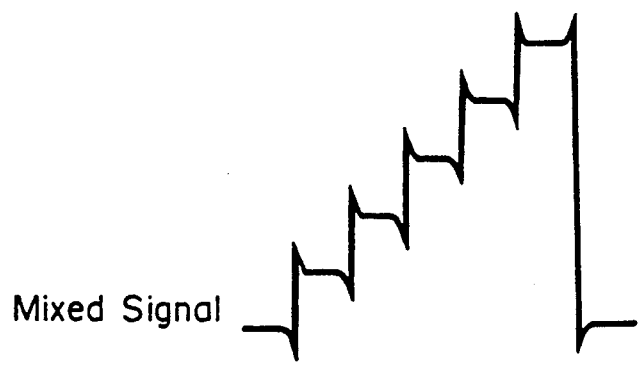
Figure 3D:

When the aperture correcting signal is not superimposed upon the reference voltage, as shown in FIG. 8D, most of the aperture correcting signal is compressed at the brightness higher than the reference voltage Vo. However, according to this embodiment, since the aperture correcting signal is superimposed upon the reference voltage, as shown in FIG. 8E, the aperture correcting signal superimposed upon the reference voltage Vo is mixed with the video signal whose luminance level is higher than the reference voltage Vo so that the video signal added with the aperture correcting signal is maintained even at its compressed high brightness portion. Hence, the video signal developed at the output terminal 25 becomes the signal whose aperture is emphasized satisfactorily over the whole luminance level.

Figure 1:
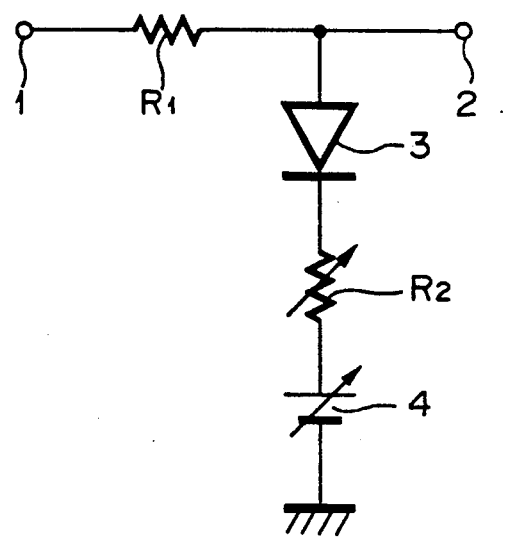
FIG. 1 is a diagram showing an example of a white compression circuit according to the prior art.
Figure 2A:
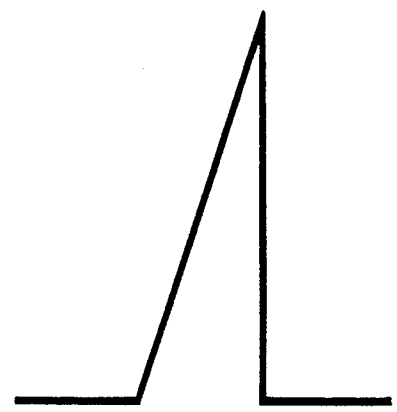
FIGS. 2A and 2B are respectively diagrams used to explain operation of the conventional white compression circuit shown in FIG. 1.
Figure 2B:
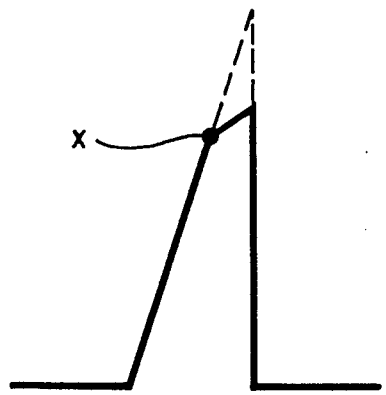
Figure 4:
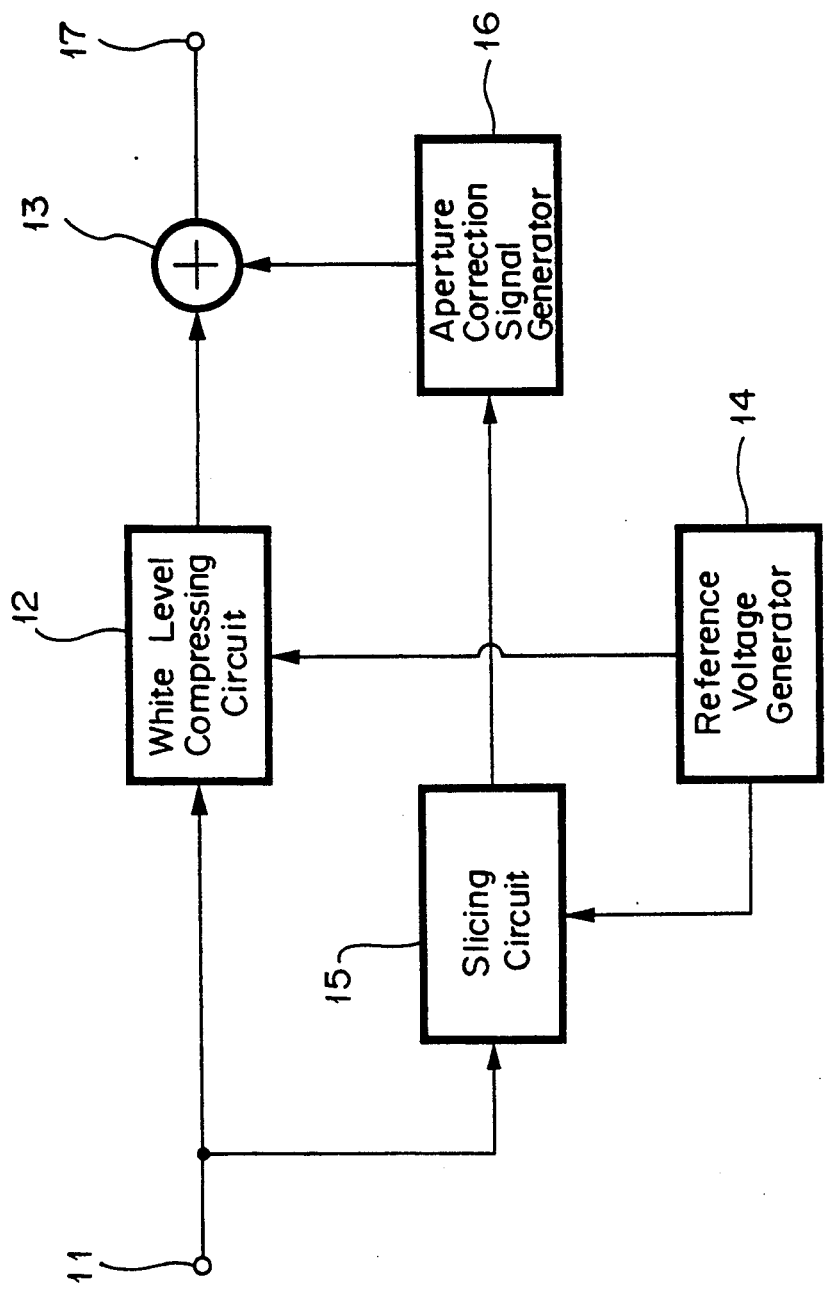
FIG. 4 is a block diagram showing an arrangement of another conventional white compression circuit.
Figure 5A:
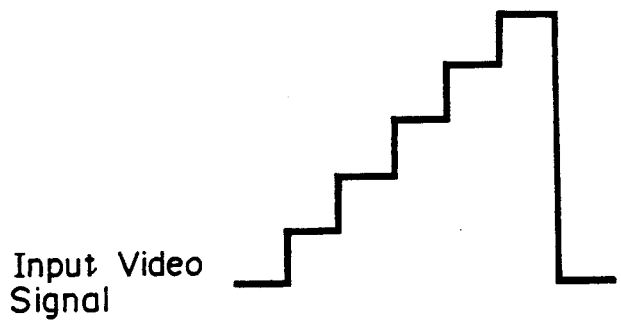
FIGS. 5A through 5E are waveform diagrams used to explain a conventional aperture correcting operation.
Figure 5B:
Figure 5C:
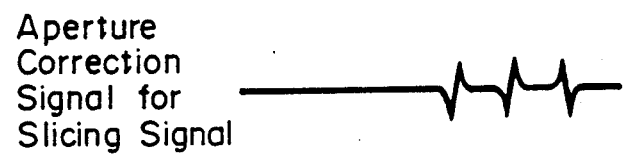
Figure 5D:
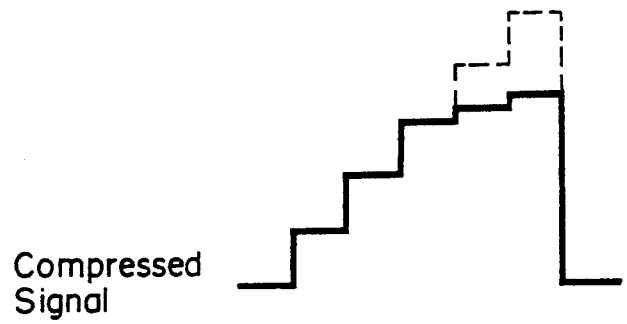
Figure 5E:
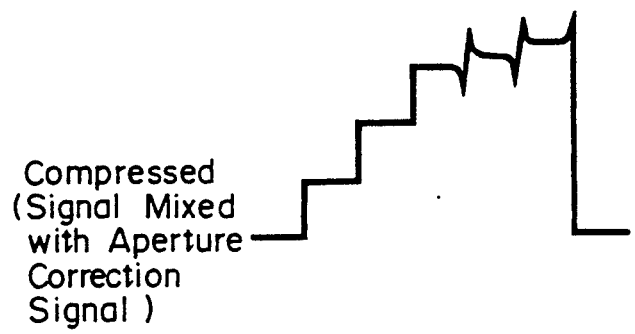

Since the high brightness portion is compressed and the aperture is emphasized as described above, it becomes unnecessary to provide the circuit in which the only the compressed high brightness portion is extracted to form the aperture correcting signal. Thus, the arrangements of the elements relating to the white compression circuit 24 can be simplified. That is, the slicing circuit 15, the aperture correcting signal generator circuit 16 for the high brightness portion and the mixer 13 are needed in the prior art as shown in FIG. 4. According to the present invention, these circuits 15, 16 and 13 are removed and hence the circuit configuration of the video camera can be simplified.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A video camera comprising:
   aperture correcting signal generating means for generating an aperture correcting signal from a video signal of a picked-up image;
   means for generating a reference level representing a video signal brightness level;
   means for modulating said reference level with said aperture correcting signal;
   signal level compressing means for compressing said video signal when said video signal exceeds the modulated reference level; and superimposing means for superimposing said aperture correcting signal onto said video signal and means for supplying the superimposed video and aperture correcting signals to said signal level compressing means.

2. The video camera according to claim 1, in which said means for generating a reference level includes means for generating an adjustable reference voltage.

* * * * *